United States Patent
Braun et al.

(10) Patent No.: US 6,275,359 B1
(45) Date of Patent: Aug. 14, 2001

(54) HEAD ARRANGEMENT FOR MULTITRACK RECORDING INTEGRATED TAPE GUIDANCE

(75) Inventors: Günter Braun, Niedereschach; Klaus Oldermann, Villingen-Schwenningen, both of (DE)

(73) Assignee: Deutsche Thomson-Brandt GmbH (DE)

( * ) Notice: Subject to any disclaimer, the term of this patent is extended or adjusted under 35 U.S.C. 154(b) by 0 days.

(21) Appl. No.: 09/400,234

(22) Filed: Sep. 21, 1999

(30) Foreign Application Priority Data

Oct. 13, 1998 (DE) .............................. 198 46 878

(51) Int. Cl.$^7$ ............................. G11B 5/56; G11B 21/24
(52) U.S. Cl. .......................................... 360/291.3
(58) Field of Search .................... 360/128, 114, 360/291.2, 291.3, 291, 241.1

(56) References Cited

U.S. PATENT DOCUMENTS

| | | | |
|---|---|---|---|
| 3,882,543 | * 5/1975 | Richards | 360/109 |
| 4,287,543 | * 9/1981 | Banks | 360/109 |
| 4,389,689 | 6/1983 | Sims, Jr. | |
| 4,970,614 | 11/1990 | Nakatsuka | |
| 5,392,181 | * 2/1995 | Lhureau et al. | 360/114 |
| 5,674,583 | * 10/1997 | Nakayama et al. | 428/64.4 |
| 5,726,964 | * 3/1998 | Kesteren et al. | 369/112 |
| 5,734,539 | * 3/1998 | Vollmann | 360/132 |
| 5,978,188 | * 11/1999 | Kaaden et al. | 360/130.32 |
| 6,043,958 | * 3/2000 | Kaaden et al. | 360/109 |
| 6,067,213 | * 5/2000 | Oldermann et al. | 360/130.21 |

FOREIGN PATENT DOCUMENTS 1-296430 * 11/1989 (JP).
7-065434 * 3/1995 (JP).

OTHER PUBLICATIONS

Patent Abstracts of Japan, vol. 13, No. 460, (P–946) Oct. 18, 1989.
Patent Abstracts of Japan, vol. 18, No. 445, (P–1789), Aug. 18, 1994.
Patent Abstracts of Japan, 09138922.
Search Report for German Application No. 19846878.4.

* cited by examiner

*Primary Examiner*—William Klimowicz
(74) *Attorney, Agent, or Firm*—Joseph S. Tripoli; Joseph J. Laks; Daniel E. Sragow

(57) ABSTRACT

Head arrangements for appliances for longitudinal multi-track recording and/or replay of signals using a recording medium in the form of tape have stationary multitrack heads which have a large number of individual heads. The head arrangement according to the invention is formed with a first and a second head-mounting device, in which case the first head-mounting device is intended for engagement with the recording medium and has tape guides for the recording medium as well as in each case one recess for the arrangement of a magnetic multitrack head and for the arrangement of the optical scanner of a magneto-optical multitrack head which is arranged in the second head-mounting device.

5 Claims, 3 Drawing Sheets

HEAD ARRANGEMENT FOR MULTITRACK RECORDING INTEGRATED TAPE GUIDANCE

BACKGROUND OF THE INVENTION

The invention is based on an appliance for longitudinal multitrack recording and/or replay of signals, in particular of digital signals, using a magnetic tape. One field of application for this technology is, for example, so-called data streamers for producing data copies in relatively large data processing systems.

Such recording and/or replay of data are/is carried out by means of a head arrangement which is arranged on the drive chassis of the appliance and has a stationary multitrack head which has an appropriate number of individual heads for writing and reading the multiple tracks. U.S. Pat. No. 5,027,245 discloses, for example, a recorder which, during multitrack recording of data, allows the data which have just been recorded to be read by a further multitrack head and, furthermore, allows bidirectional multitrack recording and replay of data.

The design of such head arrangements is relatively complex, and they need to be highly accurate, which can be achieved by individual adjustment, particularly when a plurality of multitrack heads are used in one head arrangement. Furthermore, multitrack recording and/or replay of data is dependent on defined and precise guidance of the recording medium with respect to the head arrangement.

SUMMARY OF THE INVENTION

The invention is based on the object of simplifying the design of head arrangements for longitudinal multitrack recording and/or replay with a recording medium in the form of tape, and of improving the guidance of the recording medium.

This object is achieved by the features specified in claim 1.

The invention is based on the idea of providing a head-mounting device like a plate for the arrangement of multitrack heads, which device has recesses for holding the multitrack heads and adjusting means for adjusting them, and can be arranged in a simple manner, stationary, on the drive chassis of the recorder once the multitrack heads have been arranged in the recesses, in which case the arrangement in the recesses may advantageously entirely or partially include the adjustment of the multitrack heads. Furthermore, the head-mounting device has integrated means for guiding the recording medium in the form of tape, by which means defined relationships are achieved in a simple manner with respect to guidance of the tape height and the loop angle in the region of the head arrangement. The integration of means for guiding the recording medium in the form of tape has the advantage that the design complexity of the appliance is reduced.

The use of such a head-mounting device is particularly advantageous for a data recorder in which the data are written to a recording medium using a magnetic multitrack head comprising magnetic individual heads, but are read by means of a magneto-optical multitrack head, comprising magneto-optical individual heads. According to the invention, a magnetic multitrack head and an optical scanner (which can be engaged with the recording medium) of the magneto-optical multitrack head are arranged in a head-mounting device like a plate for such a recorder. Another or a separate head-mounting device is envisaged for the arrangement of the other elements of the magneto-optical multitrack head, which, like the first head-mounting device mentioned above, is arranged stationary on the drive chassis of the data recorder, order to form the complete head arrangement for longitudinal multitrack recording and/or replay of data signals.

A separate apparatus is envisaged, according to the invention, for the arrangement of the optical scanner, which allows the optical scanner to be positioned automatically in the correct position with respect to the recording medium, and allows it to be arranged on the drive chassis in a simple manner. The arrangement of the optical scanner is preferably carried out first of all, that is to say before the arrangement of a magnetic multitrack head.

The head-mounting device in the form of a plate thus forms the front panel of the head arrangement, which simplifies the arrangement and/or adjustment of multitrack heads.

Developments and further advantages of the invention result from the following description and the dependent claims 2 to 5.

The invention is furthermore based on the object of specifying a recorder for multitrack recording and/or replay with an improved head arrangement as well as improved guidance of the recording medium.

This object is achieved by the features specified in claim 6.

BRIEF DESCRIPTION OF THE DRAWINGS

The invention will be explained in more detail in the following text, with reference to the drawing, in which.

In this case, parts which correspond to one another are provided with equivalent reference symbols.

DETAILED DESCRIPTION OF THE PREFERRED EMBODIMENTS

Figure 1:
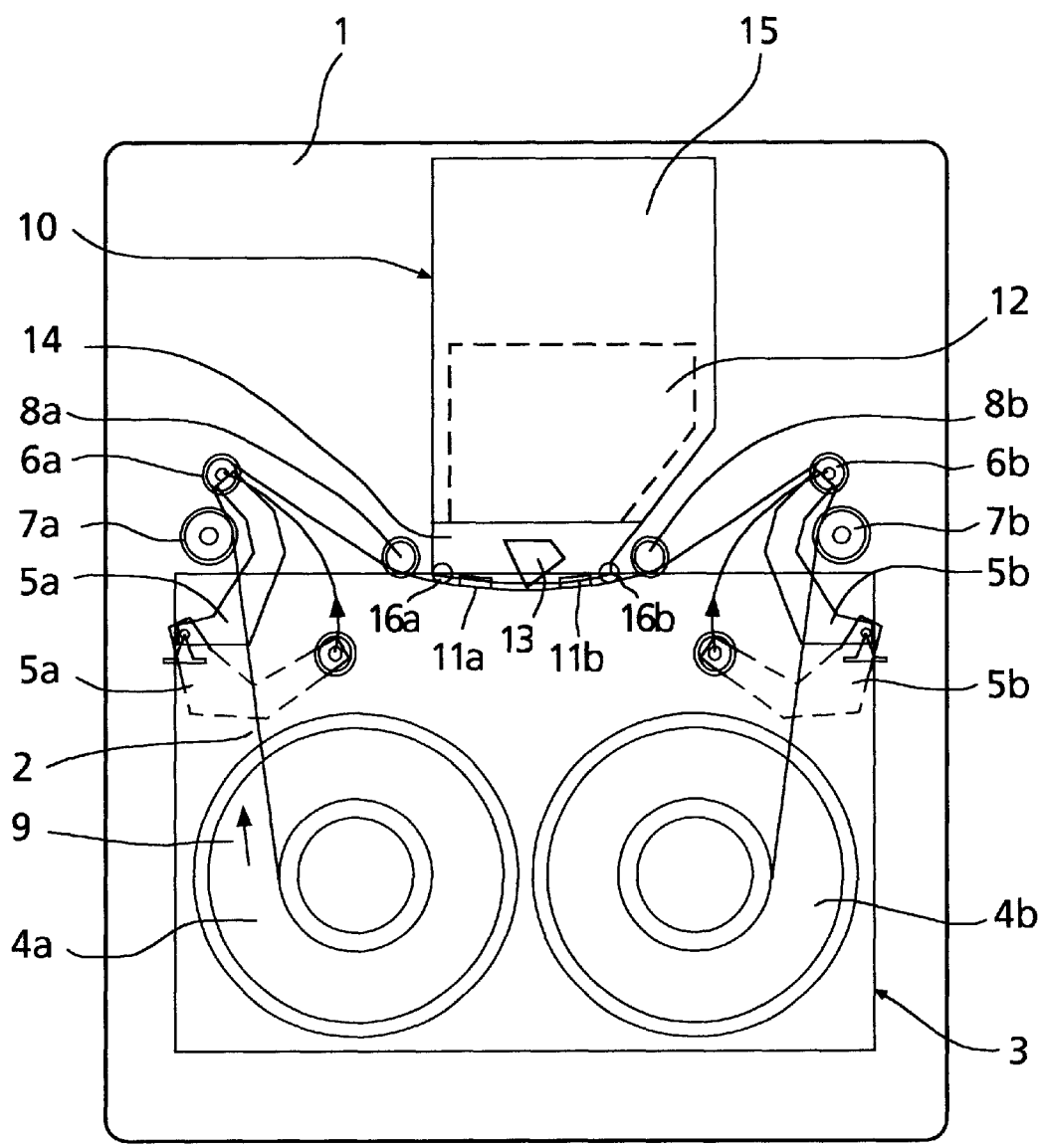
FIG. 1 shows a plan view of the chassis of a recorder for multitrack recording and/or replay of data signals using a magnetic tape.

FIG. 1 shows a plan view of a drive chassis 1 for a recorder for longitudinal multitrack recording and/or replay of data signals using a magnetic tape, called the recording medium 2 in the following text. The recording medium 2 is kept in a cassette 3 on spools 4a, 4b which are driven by spool drives. The recording medium 2 is drawn out of the cassette by a threading motor via threading elements 5a, 5b and is passed by means of guide and/or deflection means 6a, 6b; 7a, 7b; 8a, 8b, which are known per se, to an overall multihead arrangement which is stationary on the chassis 1 and is intended for longitudinal multitrack recording and/or replay of the data signals, this overall multihead arrangement being called the head arrangement 10 in the following text. The representation of t he threading elements 5a, 5b by dashed lines is intended to show, for example, the "standby" appliance operating mode. The threading motor, the spool drives, spool pins which engage with the spools 4a, 4b as well as means which are likewise known per se for tape tension control and/or regulation are not shown.

The recording, and thus corresponding replay, of data are intended to be carried out bidirectionally. In this case, the respective spool drive is also intended to be used to drive the recording medium 2 in the recording and replay operating modes of the recorder. However, it should be mentioned that both the bidirectional recording and the use of the respective spool drive in the recording and replay operating modes are not essential to the invention.

The recording of data in the recording medium 2 movement direction shown by an arrow 9 is carried out using a first magnetic multitrack head 11a, and in the other movement direction by a second magnetic multitrack head 11b. For this purpose, the individual heads, which are preferably arranged like a matrix, can be positioned within a magnetic multitrack head 11a, 11b such that, for example, the upper tape half of the recording medium 2 is assigned to the first magnetic multitrack head 11a, and the lower tape half of the recording medium 2 is assigned to the second magnetic multitrack head 11b. However, it is also feasible for the individual heads to be arranged inside a magnetic multitrack head 11a, 11b, so that data recordings with both multitrack heads 11a, 11b leave tracks which are interleaved with one another. For example, there are typically 16 individual heads per magnetic multitrack head 11a, 11b for a data streamer as mentioned initially.

On the other hand, only one multitrack head is provided for data replay in one movement direction or the other. This is in the form of a magneto-optical multitrack head 12, in which case its optical scanner 13 which engages with the recording medium 2 in order to read the data is arranged between the two magnetic multitrack heads 11a, 11b. The magnetic multitrack heads 11a, 11b and the optical scanner 13 are arranged in a first head-mounting device 14 which, together with a second head-mounting device 15, forms the stationary head arrangement 10 which is intended for longitudinal multitrack recording and/or replay of the data signals. In addition to lens systems which are not shown and magneto-optical electrical transducers for the magneto-optical multitrack head 12, the second head-mounting device 15 may contain appropriate read amplifiers.

In order to achieve defined angular relationships in the region of the head arrangement 10 together with improved tape guidance for the recording medium 2, the first head-mounting device 14 (which is shown in more detail in FIGS. 2a–2c) has, according to the invention, tape-guidance means 16a, 16b; 17a, 17b in the respective inlet and outlet region of the recording medium 2 as well as in the region of the optical scanner 13. According to the invention, these tape-guidance means 16a, 16b; 17a, 17b are not, however, provided with characteristics for tape-height guidance of the recording medium 2, since adequate tape-height guidance in the region of the head arrangement 10 can actually be provided by the choice of the arrangement of the tape-guidance and/or tape-deflection means 8a, 8b already mentioned.

Figure 2A:
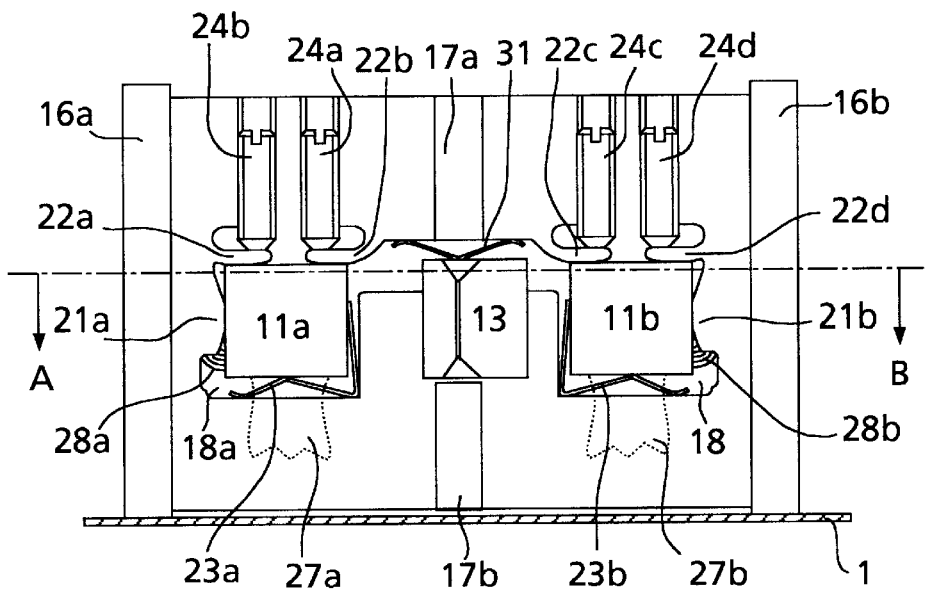
FIGS. 2a–2c show head-mounting devices with multitrack heads.
Figure 2B:
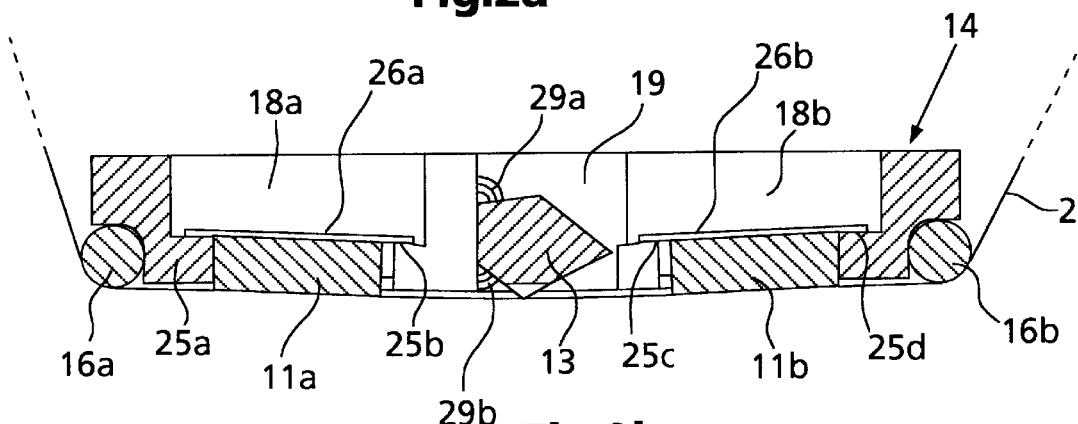
Figure 2C:
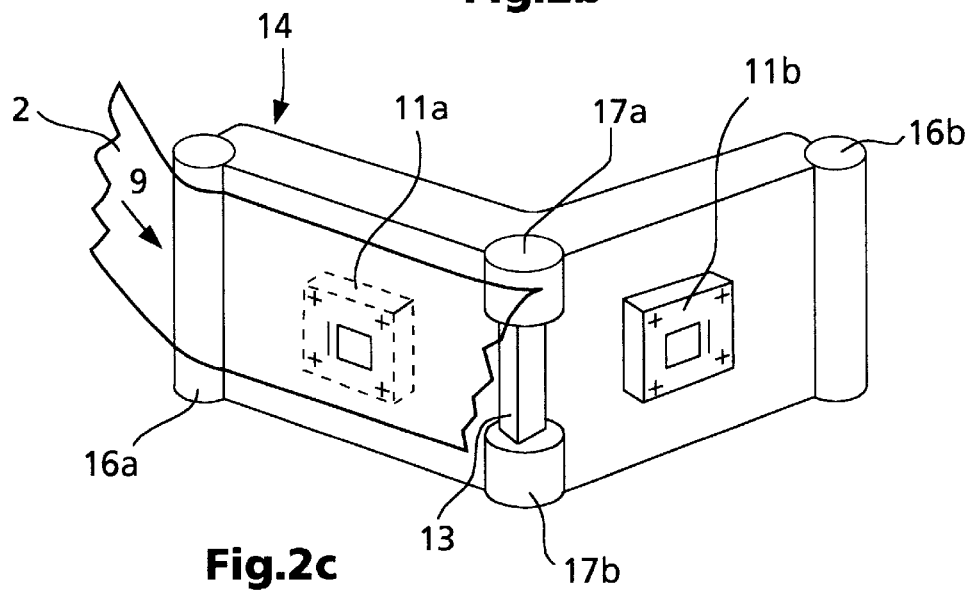

FIGS. 2a–2c show various embodiments of the first head-mounting device 14 schematically, in which case FIG. 2a shows the front face facing the recording medium 2 of a first embodiment, and FIG. 2b shows a section view along the section line A–B of this embodiment, while FIG. 2c shows a perspective view, which shows in particular the front face facing the recording medium 2, of a second embodiment, which is formed to be angled in comparison with the first embodiment, which is virtually stretched out. Both embodiments are designed in the form of plates and have recesses 18a, 18b; 19 for the arrangement of all the multitrack heads 11a, 11b; 12. The position of the recesses 18a, 18b which are provided for the magnetic multitrack heads 11a, 11b is preferably chosen in such a manner that these multitrack heads 11a, 11b are arranged, for example, symmetrically with respect to the magneto-optical multitrack head 12 and/or symmetrically with respect to its optical scanner 13, whose prismatic profile between the tape-guidance means 17a, 17b formed on it can be used in an advantageous manner to arrange it in the recess 19.

As shown symbolically by the applied substance 29a, 29b, the optical scanner 13 is arranged such that it is fixed in the recess 19 by means of an adhesive (for example 3 Bond 3014 C). The arrangement of the optical scanner 13, which is carried out according to the invention by means of a separate apparatus 30 and is preferably carried out before the arrangement of the magnetic multitrack heads 11a, 11b, will be explained later with reference to FIGS. 3a–3c.

The magnetic multitrack heads 11a, 11b are arranged in the first head-mounting device 14 such that their height and azimuth angle can be adjusted. For this purpose, the respective magnetic multitrack head 11a; 11b is mounted by means of a formed region 21a; 21b (which engages like a wedge at the side with the multitrack head 11a; 11b) on a vertical wall of the recess 18a; 18b and of two projections 22a, 22b; 22c, 22d from the recess 18a; 18b (which engage with the upper face of the multitrack head 11a; 11b), as well as by means of a spring element 23a; 23b which half-surrounds the multitrack head 11a; 11b, is formed like an angled clip and is at the same time held stressed, in such a manner that, owing to the stress in the spring element 23a; 23b, forces act on the multitrack head 11a; 11b parallel to and at right angles to the movement direction (arrow 9) of the recording medium 2. A first 24a; 24c and a second 24b; 24d adjusting screw in this case act on the projections 22a, 22b; 22c, 22d, which screws are screwed into the recess 18a; 18b at right angles to the movement direction of the recording medium 2. The height of the multitrack head 11a; 11b can be adjusted by means of the two adjusting screws 24a, 24b; 24c, 24d. The first adjusting screw 24a; 24c is additionally intended for adjusting the azimuth angle, with the wedge-like formed region 21a; 21b in the recess 18a; 18b at the same time forming a bearing on which the magnetic multitrack head 11a; 11b can rotate during the adjustment process.

The first head-mounting device 14 furthermore has stops 25a, 25b; 25c, 25d which are formed on the recesses 18a, 18b, by means of which the so-called projection distance X (FIG. 3b) is provided, by which the magnetic multitrack heads 11a, 11b are also intended to project out of the plane of the tape of the recording medium 2, in a manner known per se, for reasons relating to tape/head contact. The multitrack heads 11a, 11b can be held engaged with the stops in a simple manner by means of such stops as well as by means of a spring element which is not shown but is arranged between the respective multitrack head 11a, 11b and the second head-mounting device 15, in which case the respective stops on the multitrack-head side can be formed, for example, by a printed circuit 26a, 26b, which circuits are arranged on the side of each multitrack head 11a, 11b facing away from the recording medium, and contain electrical connecting lines 27a, 27b for the individual heads of a multitrack head 11a, 11b.

As an alternative to the said spring elements, it is also possible—as is shown symbolically by the applied substances 28a, 28b—for the magnetic multitrack heads 11a, 11b to be fixed by means of an adhesive (for example 3 Bond 3014 C) in the recesses 18a, 18b, after the adjustments to their height and azimuth angles, which are carried out while replaying a reference tape on which there are appropriate signals. In the case of this alternative, the arrangement of the second head-mounting device 15 on the chassis 1 and its connection to the first head-mounting device 14 are then carried out after the fixing of the optical scanner 13 and of the magnetic multitrack heads 11a, 11b.

A screw connection can be provided, for example, between the tape-guidance means 16a, 16b and the chassis 1 for the arrangement of the first head-mounting device 14. A so-called snap connection to the first head-mounting device 14 is preferably provided for the arrangement of the second head-mounting device 15.

Figure 3C:
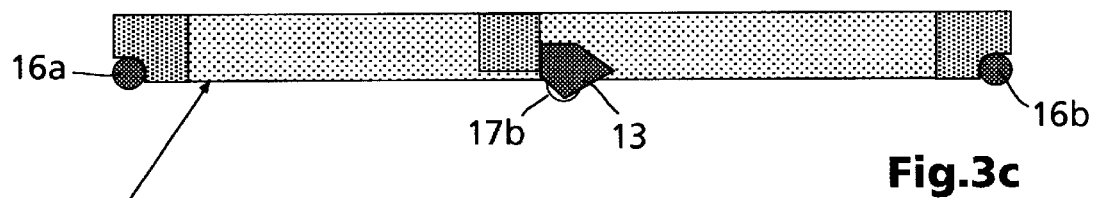
FIGS. 3a–3d show a head-mounting device with an apparatus for the arrangement of a magneto-optical multitrack head.
Figure 3A:
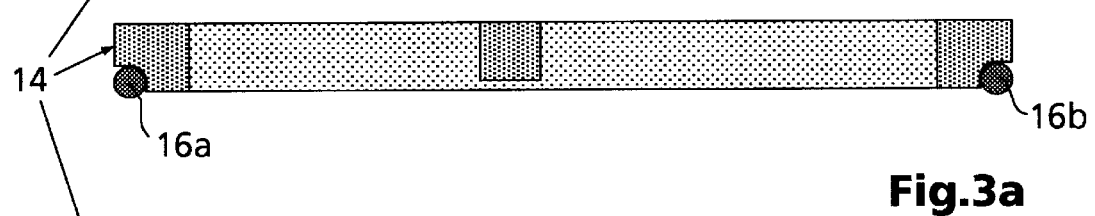
Figure 3B:
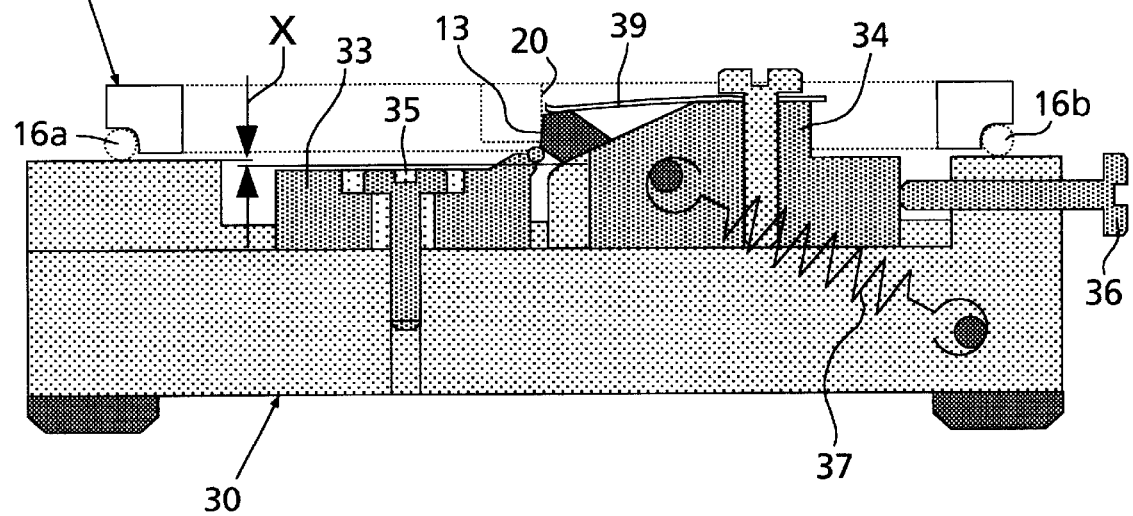
Figure 3D:
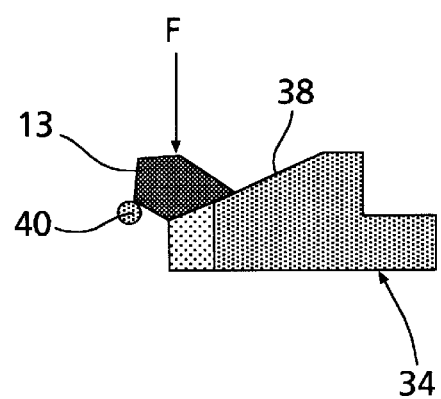

FIG. 3a and FIG. 3c use the illustration of the first head-mounting device 14 and of the apparatus 30 to show the steps relating to the arrangement of the optical scanner 13 of the magneto-optical multitrack head 12. In this case, FIG. 3a shows the first head-mounting device 14 in a manner corresponding to the section illustration in FIG. 2b, but without the optical scanner 13, which is initially held in the recess 19 by means of the spring force of a spring element 31 (FIG. 2a). As is shown in FIG. 3b, the first head-mounting device 14 is positioned on the apparatus 30 together with the optical scanner 13 (which is held by the spring force of the spring element 31), in order to arrange and fix it in the recess 19. FIG. 3c shows the first head-mounting device 14 in a manner corresponding to the section illustration in FIG. 2b, while FIG. 3c can correspond to the illustration of the first head-mounting device 14 both before and after the arrangement of the optical scanner 13 and its fixing by means of adhesive.

The apparatus 30 is in the form of a block-like table on which the first head-mounting device 14 is positioned, with its front face in a predetermined position in particular with respect to the projection distance X and the engagement and arrangement of the optical scanner 13 on an inner wall 20 of the recess 19. A first mounting block 33 and a second mounting block 34 are for this purpose arranged in a recess which is provided in a corresponding manner on the apparatus 30. The first mounting block 30 is arranged on the apparatus 30, fixed by means of a screw connection 35 which allows fine adjustment. The second mounting block 34 is, in contrast, arranged such that it can be moved parallel to the plane of the tape in that an adjusting screw 36, which projects at the side out of the apparatus 30 and acts on the second mounting block 34, as well as a restoring spring 37, which acts on the second mounting block 34 are provided on the apparatus 30, for example a guide like a carriage, supporting or counteracting the spring force of the said restoring spring 37, depending on the adjustment movement direction.

A reference plane 38 which is matched to the front face of the optical scanner 13 is formed, and a stretched fixing spring 39 for the scanner 13 is arranged, on the second mounting block 34, for the engagement and arrangement of the optical scanner 13. The first mounting block 33 has a rod-like formed region 40 of cutting or roller profile for the engagement and arrangement of the optical scanner 13, which—as shown in FIGS. 3b and 3c—engages together with the reference plane 38 and the fixing spring 39 with the optical scanner, as soon as the first head-mounting device 14 is positioned on the apparatus 30, in which case the head-mounting device 14 (which can be held in this position by means of an interlock which can pivot but is not shown) is supported by its tape-guidance means 16a, 16b; 17a, 17b on the apparatus 30, and the force F which is in this case produced by the fixing spring 39, acts on the optical scanner 13. The optical scanner 13 can then be moved in a simple manner by means of the adjusting screw 36 precisely into the position which is intended for its arrangement, and can then be fixed by means of adhesive.

An appropriately modified apparatus 30 is used for an arrangement of the optical scanner 13 in a first head-mounting device 14 as shown in FIG. 2c.

What is claimed is:

1. Head arrangement for longitudinal multitrack recording and/or replay of signals on and from a recording medium in the form of tape, said head arrangement comprising:

two stationary magnetic multitrack heads and one stationary magneto-optical multitrack head including an optical scanner, each of them have a large number of individual heads;

a first head-mounting device being provided for arrangement of the magnetic multitrack heads and the optical scanner of the magneto-optical multitrack head by means of recesses which are formed within the first head-mounting device, the optical scanner is non-adjustably arranged between the magnetic multitrack heads while the magnetic multitrack heads are adjustably arranged within their respective recess for adjustment with respect to azimuth angle and height position;

a first and a second adjusting screw being screwed into the recess of the respective magnetic multitrack head at right angle to movement direction of the recording medium for the adjustment of the respective magnetic multitrack head with respect to the azimuth angle and the height position, whereby both the respective first and the respective second adjusting screw are intended for adjusting the height position by means of force of a spring element which is opposite arranged in the respective recess, and the respective first adjusting screw is additionally intended for adjusting the azimuth angle with a wedge-like formed region in the respective recess at the same time forming a bearing on which the magnetic multitrack head can rotate during the adjustment process;

a second head-mounting device which is provided for the arrangement of the magneto-optical multitrack head and fitted together with the first head-mounting device to form said head arrangement; and tape guides for the recording medium which are arranged at the first head-mounting device.

2. Head arrangement according to claim 1, wherein a separate apparatus is provided for the arrangement of the optical scanner of the magneto-optical multitrack head and has arranging means for arranging it in the recess which is provided for the optical scanner.

3. Head arrangement according to claim 1, wherein the first head-mounting device is in the form of a front panel.

4. Head arrangement according to claim 3, wherein the optical scanner and the magnetic multitrack heads are fixed after the latter have been adjusted with respect to azimuth angle and height position by means of an adhesive in the front panel.

5. Recorder having a head arrangement for longitudinal multitrack recording and/or replay of signals on and from a recording medium in the form of tape, said head arrangement comprising:

two stationary magnetic multitrack heads and one stationary magneto-optical multitrack head including an optical scanner, each of them have a large number of individual heads;

a first head-mounting device being provided for arrangement of the magnetic multitrack heads and the optical scanner of the magneto-optical multitrack head by means of recesses which are formed within the first head-mounting device, the optical scanner is non-adjustably arranged between the magnetic multitrack heads while the magnetic multitrack heads are adjustably arranged within their respective recess for adjustment with respect to azimuth angle and height position;

a first and a second adjusting screw being screwed into the recess of the respective magnetic multitrack head at right angle to movement direction of the recording medium for the adjustment of the respective magnetic multitrack head with respect to the azimuth angle and the height position, whereby both the respective first and the respective second adjusting screw are intended for adjusting the height position by means of force of a spring element which is opposite arranged in the respective recess, and the respective first adjusting screw is additionally intended for adjusting the azimuth angle with a wedge-like formed region in the respective recess at the same time forming a bearing on which the magnetic multitrack head can rotate during the adjustment process;

a second head-mounting device which is provided for the arrangement of the magneto-optical multitrack head and fitted together with the first head-mounting device to form said head arrangement; and tape guides for the recording medium which are arranged at the first head-mounting device.

* * * * *